(12) United States Patent
Maertens (10) Patent No.: US 6,295,408 B1
(45) Date of Patent: Sep. 25, 2001

(54) FLEXIBLE DSP INTERFACE CIRCUIT

(75) Inventor: James N. Maertens, Sunnyvale, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/059,665

(22) Filed: Apr. 13, 1998

(51) Int. Cl.⁷ .............................. H04N 5/781; H04N 5/85
(52) U.S. Cl. ............................................ 386/105; 386/125
(58) Field of Search .................................... 386/105, 106, 386/124, 125, 126, 104, 68, 69, 70, 46, 45, 1, 39, 40; H04N 5/781, 5/85

(56) References Cited

U.S. PATENT DOCUMENTS 5,377,051 * 12/1994 Lane et al. .................... 360/33.1

* cited by examiner

Primary Examiner—Robert Chevalier
(74) Attorney, Agent, or Firm—Townsend and Townsend and Crew LLP (57) ABSTRACT

An interface circuit that facilitates communication between a DSP and decoder in a disc system or other application. The interface circuit is programmable so multiple communication interfaces can be supported without requiring additional specialized logic uniquely tailored for each particular communication interface. Sector and countdown-type data transfers are supported by the interface circuit.

23 Claims, 7 Drawing Sheets

| Signal | Programmable | Options |
|---|---|---|
| DVDREQ | Polarity | Active High / Active Low |
| DVDACK | Polarity | Active High / Active Low |
| DVDTOS | Polarity | Active High / Active Low |
| DVDERROR | Polarity | Active High / Active Low |
| DVDCLK | Strobe Edge | Rising Edge / Falling Edge |
| DVDDATA[7:0] | Strobe Signal | DVDCLK / DVDACK |

| Signal | Programmable | Options |
|---|---|---|
| DVDREQ | Polarity | Active High / Active Low |
| DVDACK | Polarity | Active High / Active Low |
| DVDTOS | Polarity | Active High / Active Low |
| DVDERROR | Polarity | Active High / Active Low |
| DVDCLK | Strobe Edge | Rising Edge / Falling Edge |
| DVDDATA[7:0] | Strobe Signal | DVDCLK / DVDACK |

FLEXIBLE DSP INTERFACE CIRCUIT

BACKGROUND OF THE INVENTION

The present invention relates generally to DSP interface circuits employed in disc systems and more specifically to a flexible DVD-DSP interface circuit that may be programmed to support multiple communication interfaces between different DVD DSP's and DVD decoders.

The term "disc system" as used herein is directed to any system (e.g., optical, magnetic, etc.) that accesses data held on a rotating disc. Optical disc-drive systems include read-only compact discs, laser discs, DVD's (also referred to as "digital versatile discs" and "digital video discs," and including DVD-ROM, DVD-Video and DVD-Audio), as well as their writable counterparts (e.g., CD-R, CD-RW, DVD-R and DVD-RAM). Additional information regarding DVD technology may be found in J. Talyor, *DVD Demystified*, McGraw-Hill (1998), which is hereby incorporated by reference in its entirety for all purposes.

A typical DVD disc system (also referred to herein as a "DVD system") includes the following elements: (1) a disc access mechanism for spinning and reading data from a disc, (2) a digital signal processor ("DSP") for translating data read from the disc into a format for processing by the remainder of the system, (3) a decoder for converting data provided by the DSP into audio and/or video signals and (4) a microcontroller for controlling the operation of the system. Typically, in a DVD system a DSP and its associated audio/video decoder(also referred to herein as a "DVD DSP" and "DVD decoder," respectively) are discrete semiconductor devices or chips.

The "communication interface" between a DSP and a decoder in a disc system consists of control and data signals being exchanged according to specific operating parameters (e.g., active high or low signals, rising or falling-edge signal triggers, etc.) as dictated by the DSP. A DSP interface circuit facilitates such communication.

Because the communication interface between a DVD DSP and a DVD decoder is not standardized, a DVD decoder may only support one DVD DSP in accordance with its communication interface. This causes the DVD decoder to be locked in with a particular DVD DSP which inherently limits its usefulness. To support DVD DSP chips employing a different communication interface, a single DVD decoder will require external, specialized logic thereby increasing the cost of the DVD disc system in which it resides.

Thus, it would be desirable to support multiple communication interfaces between a DSP and associated decoder in a disc system and, in particular, to support multiple communication interfaces between a DVD DSP and associated DVD decoder without requiring additional, specialized logic uniquely tailored for each particular interface.

SUMMARY OF THE INVENTION

In accordance with the present invention, an interface circuit is provided that supports multiple communication interfaces between a DSP and decoder in a disc system or other applications without requiring the addition of specialized logic uniquely tailored for each particular communication interface.

In one embodiment, a DSP interface circuit is provided which includes a data input for receiving data, a first control input for receiving a first control signal operable to control reception of such data, and a first polarity select coupled to the first control input, the polarity select being programmable to change state of the first control signal.

In another embodiment, an optical disc system is provided that includes a DSP that processes and outputs data retrieved from an optical disc. Coupled to the DSP is a DSP interface circuit having a data input for receiving the data and a plurality of control inputs for receiving a plurality of control signals operable to control reception of the data. This system also includes a plurality of polarity selects coupled to the plurality of control inputs, such polarity selects being programmable to change state of each of the plurality of control signals.

In yet another embodiment, a DVD system is provided that includes a DVD DSP that generates data signals and a plurality of control signals. Coupled to such DVD DSP is an audio/video decoder that generates audio and video signals. Included within the decoder is a DVD-DSP interface circuit which includes a data input for receiving the data signals; a plurality of control signal inputs operable to receive the plurality of control signals to control reception of the data signals; and a plurality of polarity selects coupled to the plurality of control signal inputs, such polarity selects being programmable to change state of each of the plurality of control signals. In accordance with this DVD system embodiment, the interface circuit creates a flexible DVD-DSP interface in a DVD decoder that facilitates communication with DVD DSP's having different communication interfaces without the need for additional internal or external hardware or glue logic. The interface circuit is programmable to facilitate several variations of the communication interface between a DVD DSP and a DVD decoder.

In accordance with the foregoing embodiments, the interface circuit and disc systems disclosed herein are sufficiently flexible to support multiple communication interfaces between DSP's and decoders in general, and between DVD DSP's and DVD decoders in particular. The circuit and systems disclosed are programmable so multiple communication interfaces can be supported without the need for additional hardware or logic tailored for each particular communication interface. Also, interaction by any software (external firmware or internal microcode) is minimized or eliminated once programming is complete (e.g., once programming registers are set) since the programmed changes are implemented in hardware. Hence, valuable processor power is saved because software is not required to control the flow of DVD data. Additionally, such hardware-effected programming frees up the external microcontroller in a DVD player, for example, to perform other tasks.

A further understanding of the nature and advantages of the invention may be realized by reference to the remaining portions of the specification and the drawings. In the drawings, like reference numerals indicate identical or functionally similar elements.

DESCRIPTION OF THE SPECIFIC EMBODIMENTS

Although the following discussion is directed to DVD-based systems, it would be understood by one having ordinary skill in the art that the invention described herein is applicable to a variety of systems, including optical or magnetic disc systems and satellite broadcasting systems.

Figure 1:
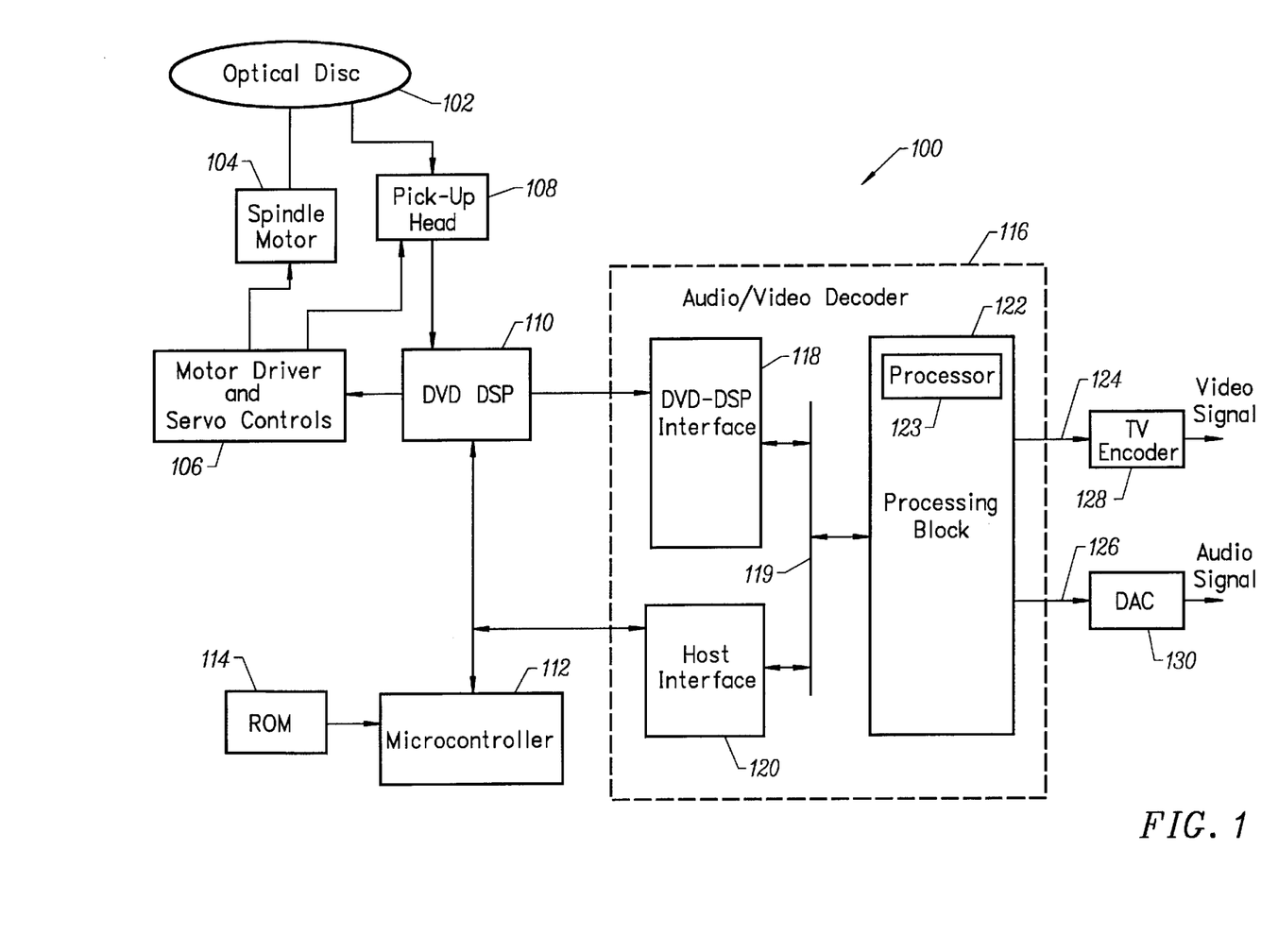
FIG. 1 is a block diagram of a DVD system including a DVD-DSP interface circuit in accordance with the present invention.

FIG. 1 provides a block diagram of a DVD system 100 including a DVD-DSP interface circuit 118 in accordance with the present invention. Specifically, system 100 includes a DVD optical disc 102 spun by a spindle motor 104 and read by a pick-up head 108 (using, for example, a red laser diode). A DVD DSP 110 controls motor 104 through conventional motor driver and servo controls 106, and receives laser pulses from head 108.

As is well known, DVD DSP 110 translates these laser pulses into an electrical format that other portions of system 100 may use. Specifically, DVD DSP 110 generates data ("DVDDATA") from pulses received from head 108 and passes this over an 8-bit wide data bus to DVD-DSP interface circuit 118. Additionally, DVD DSP 110 generates conventional control signals for communicating with interface circuit 118. These control signals, provided in Table 1 below, are forwarded to interface circuit 118 over four 1-bit serial connections.

TABLE 1

| DSP-GENERATED CONTROL SIGNALS | FUNCTION |
|---|---|
| DVDACK | Acknowledges receipt of data request (DVDREQ) from DVD-DSP interface circuit 118 and indicates the validity of DVDDATA. |
| DVDERROR | Indicates error in data signal (DVDDATA) generated by DSP 110. |
| DVDCLK | Periodic clock signal. |
| DVDTOS | Pulse that indicates reaching the top of a sector on a DVD disc (data on a DVD disc is stored on tracks broken into "sectors"; each sector contains 2048 bytes of data). |

The foregoing control signals are conventional and well-known to those having ordinary skill in DVD-based art.

Referring again to FIG. 1, a microcontroller 112 communicates with DSP 110 as well as a ROM 114 and host interface 120. Microcontroller 112 controls the operation of DVD system 100. This component provides a variety of functions, including translating user inputs into control signals for decoder 116 (via host interface 120) and DVD DSP 110 (through which, for example, user control is exercised over disc-reading operations). Microcontroller 112 also forwards information stored in ROM 114 to decoder 116, for example, to initialize system 100 at the start of operations.

Decoder 116 translates the data received from DVD DSP 110 into video, audio, sub-picture, navigation control, and other user-defined data signals. As shown in FIG. 1, the decoder includes DVD-DSP interface circuit 118, host interface 120 and processing block 122 coupled together by bus 119. DVD-DSP interface circuit 118 is discussed in greater detail below. Host interface 120, as it relates to this discussion, simply provides a communication path from microcontroller 112 to DVD-DSP interface circuit 118. Processing block 122 provides a variety of operations well known in the art, including MPEG-1, MPEG-2 and Dolby AC-3 decoding. Included within processing block 122 is a processor 123 which, among its duties, controls the flow of data within the decoder (i.e., maintains synchronization of audio and video signals), performs decoding operations and generates an ENABLE control signal for DVD-DSP interface circuit 118 (described below).

Video output 124 and audio output 126 convey decompressed video/audio signals for further processing in, for example, a TV encoder 128 and a digital-to-analog converter (DAC) 130, respectively. These video and audio signals may thereafter be forwarded to a TV monitor and stereo system, respectively.

Figure 2:
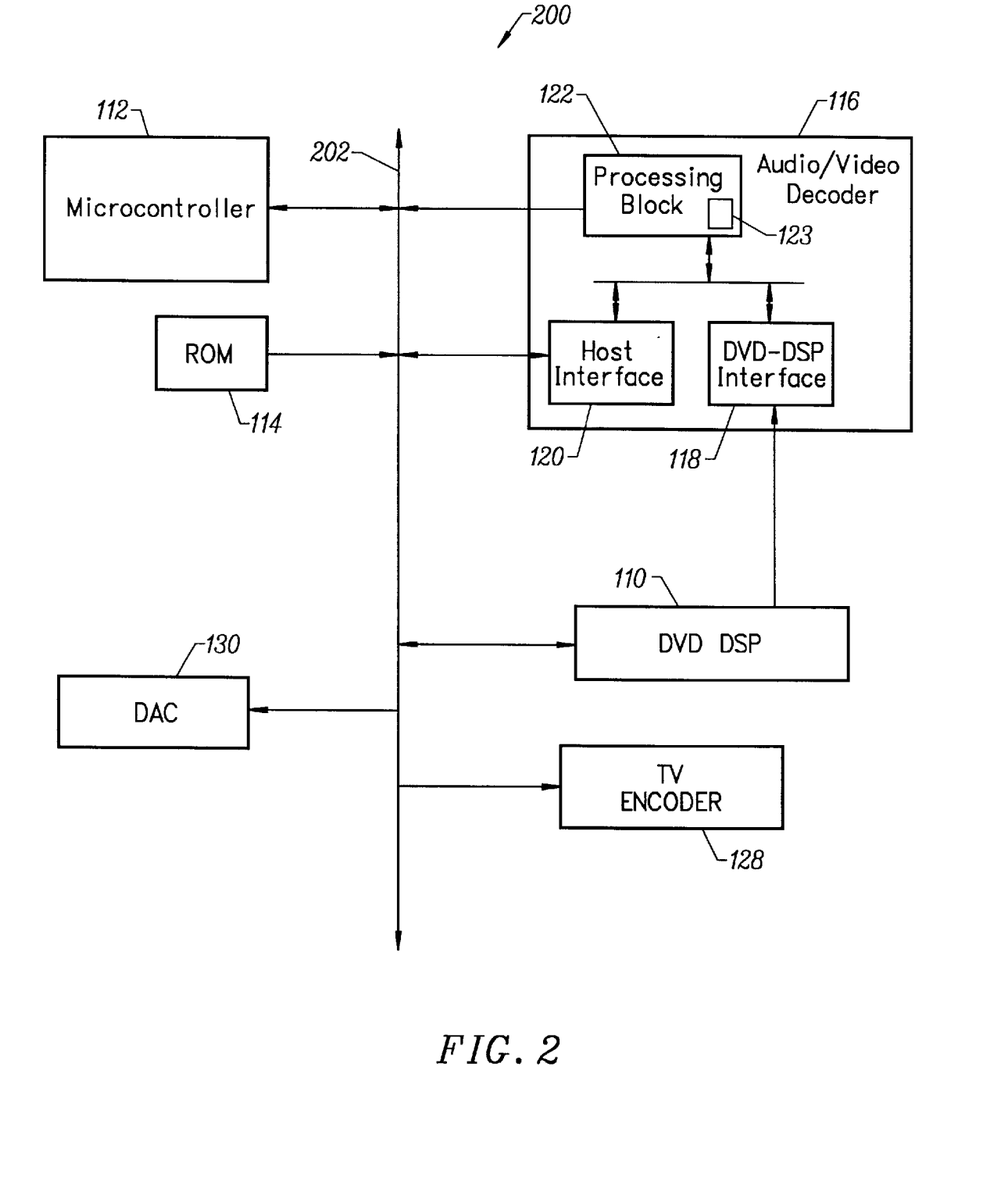
FIG. 2 is a block diagram of an alternate embodiment of the DVD system of FIG. 1 employing an interconnection bus.

FIG. 2 illustrates system 200; an alternative embodiment of system 100 using a bidirectional communication bus 202. Those portions of system 100 not shown in FIG. 2 remain unchanged.

Figure 3:
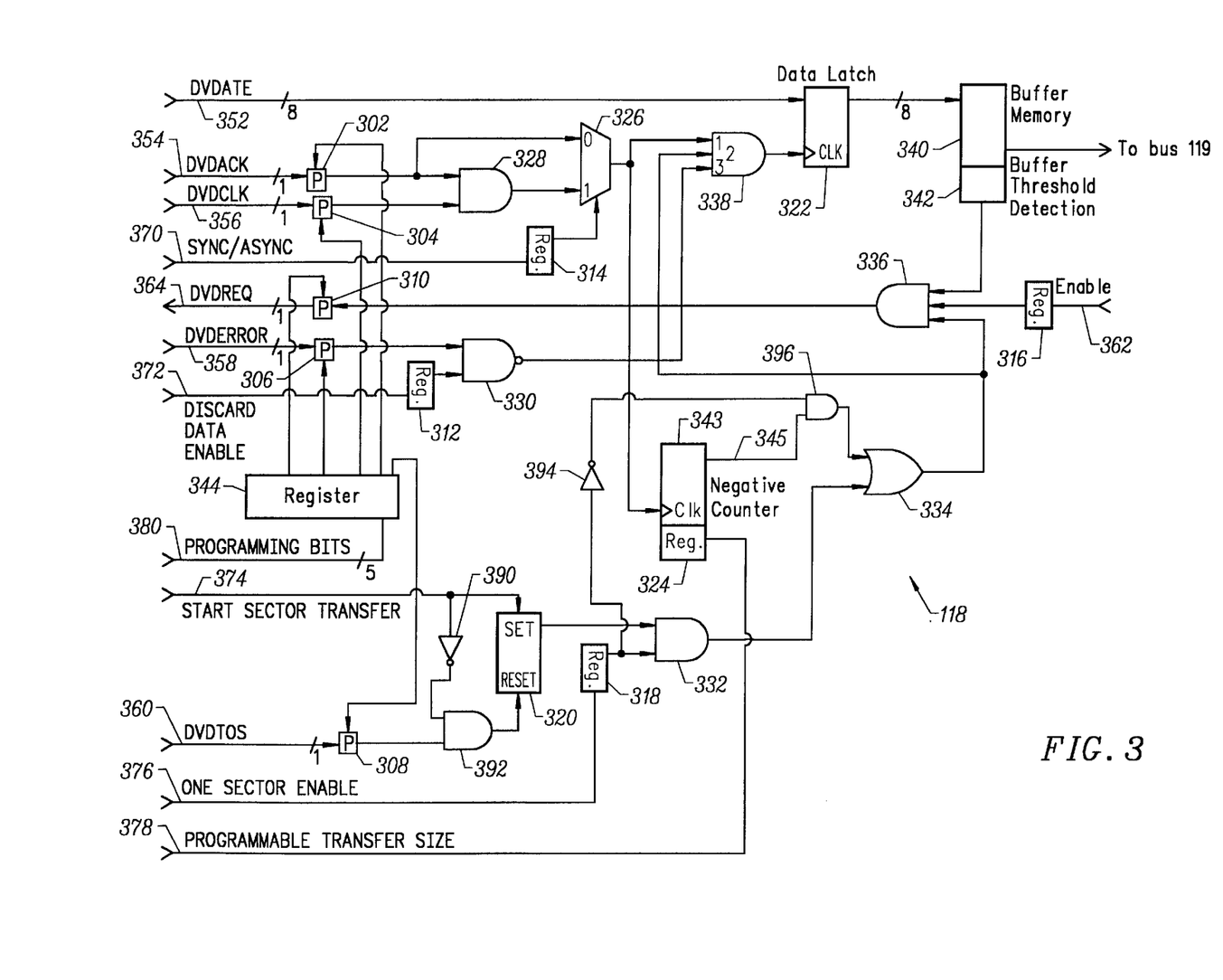
FIG. 3 is a schematic of a DVD-DSP interface circuit in accordance with the present invention.

FIG. 3 illustrate a preferred embodiment of DVD-DSP interface circuit 118. This interface includes an 8-bit parallel data input (also referred to as "data signal input") 352 for receiving DVDDATA from DVD DSP 110. Additionally, four 1-bit serial control inputs (also referred to as "control signal inputs") 354–360 receive control signals from DVD DSP 110; i.e., DVDACK, DVDCLK, DVDERROR and DVDTOS. Further, a 1-bit serial control output (also referred to as a "control signal output") 364 forwards a data request signal ("DVDREQ") to DVD DSP 110 to request data transfer from the DSP.

Interface circuit 118 also includes control inputs (also referred to as "control signal inputs") 370–380 for receiving control signals from microcontroller 112. These signals are identified and described in Table 2. (When describing the operation of signals herein, the terms "high" and "low" represent a logical one and logical zero, respectively.)

TABLE 2

| MICROCONTROLLER-GENERATED CONTROL SIGNALS | FUNCTION |
|---|---|
| SYNC/ASYNC | For strobing data, selects DVDCLK ANDed with DVDACK for synchronous operation, and DVDACK alone for asynchronous operation (1 bit). |
| DISCARD DATA ENABLE | Disables DVDERROR (when low) thereby allowing data containing errors to be loaded into data latch 322 (1 bit). |
| START SECTOR TRANSFER | Sets latch 320 and disables DVDTOS via AND gate 392 (when high) to initiate a transfer of one sector (2048 bytes of user data) (1 bit). |
| ONE SECTOR ENABLE | Enables (when high) a sector transfer (1 bit). |
| PROGRAMMABLE TRANSFER SIZE | Sets the quantity of data to be transferred when data transfer is controlled by negative counter 343 (12 bits). |
| PROGRAMMING BITS | Programs polarity selects 302–310 for control inputs 354–360 and control output 364 (5 bits). |

Referring again to FIG. 3, interface circuit 118 also receives a control signal generated internal to decoder 116; i.e., the ENABLE signal on control input 362. This conventional signal is generated by microcode running on processor 123 in processing block 122 and indicates (when high) that interface circuit 118 is ready to receive data.

Finally, interface circuit 118 passes data to the remainder of decoder 116 (via bus 119) from buffer memory 340 in accordance with typical data processing and decoding requirements in processing block 122 (FIG. 1).

Having described the signals that are input to and output from DVD-DSP interface circuit 118, a description of circuit architecture and operation will now follow. Data input 352 receives DVDDATA from DVD DSP 110 and passes this to data latch 322. Once latched or "clocked in" by AND gate 338, the data is passed to buffer memory 340. (Data may thereafter be passed from memory 340 to bus 119 in accordance with conventional decoder operations.) A conventional buffer threshold detection circuit 342 monitors the contents of memory 340 to ensure the memory does not exceed its capacity. Should memory 340 reach a predefined threshold value (which is typically less than the capacity of memory 340), circuit 342 issues an active low signal to the input of AND gate 336, which will control the value of DVDREQ on control output 364.

Figure 5:
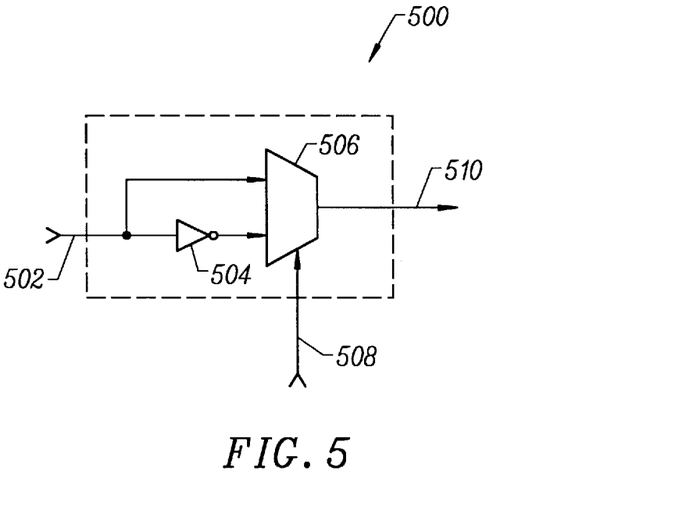
FIG. 5 is a schematic of a polarity select circuit in accordance with the present invention.

Each control input 354–360 is coupled to a polarity select 302–308, respectively. Similarly, control output 364 is coupled to a polarity select 310. An exemplary polarity select circuit 500 is illustrated in the schematic of FIG. 5, which shows a polarity select input 502 coupled to the input of an inverter 504 and one of two inputs of a 2×1 multiplexer 506. The output of inverter 504 is coupled to the second input of multiplexer 506. Selection input 508 chooses either the inverted or uninverted control signal on input 502 as polarity select output 510.

The selection inputs of polarity selects 302–310 are coupled to a programming register 344, which receives its input (i.e., the programming bits) from microcontroller 312 during initialization of system 100. (Microcontroller 312 itself retrieves such bits during initialization from ROM 114.) The value of each associated bit in register 344 will program an associated polarity select (by forcing its selection input 508 high or low) and thereby control the state of the associated control input signal (i.e., DVDACK, DVDCLK, DVDERROR or DVDTOS) or control output signal (i.e., DVDREQ) which is applied to the polarity select input (502) of the subject polarity select circuit.

Figure 4:
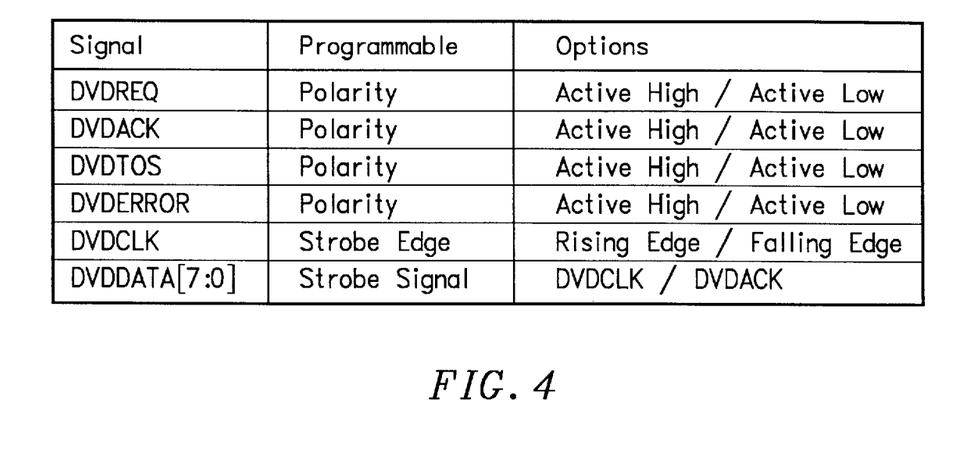
FIG. 4 is a chart illustrating control signal programmability.

The effect of this programming is illustrated in FIG. 4, which lists the programming options of each control signal and a data strobe signal. In this application, a data strobe signal (such as the output of AND gate 338 in FIG. 3) is used to "clock in" or "latch" data to a circuit (such as data latch 322). In one state the strobe signal allows the circuit to input data, and in a complementary state this signal prevents the circuit from further inputting data and thereby locks the contents of the circuit for subsequent transmission or processing.

Referring to FIGS. 3 and 4, input signals DVDACK, DVDERROR and DVDTOS (on control inputs 354, 358 and 360, respectively) and output signal DVDREQ (on control output 364) are programmable through polarity selects 302 and 306–310, respectively, to be active high or active low. Further, input signal DVDCLK on control input 356 is programmable through polarity select 304 to have an active rising or falling edge. The actual programming is determined by the signal requirements of DVD DSP 110. For example, if DSP 110 is designed to generate a DVDACK that is active low, polarity select 302 may be programmed to invert this signal so it is processed as active high within interface 118. Accordingly, polarity selects 302–310 are programmable to change state of a subject signal (i.e., from active high to active low, from rising edge trigger to falling edge trigger, or vice versa in both cases) to facilitate the particular communication interface of DSP 110.

Additionally, data signal DVDDATA has a programmable strobe signal through a SYNC/ASYNC signal (described below) which serves to strobe data into data latch 322 based (1) exclusively on DVDACK (i.e., asynchronously) if the zero input on multiplexer 326 is chosen or (2) on DVDCLK ANDed with DVDACK (i.e., synchronously) if the one input on multiplexer 326 is chosen.

As shown in FIG. 3, the output of AND gate 338 is coupled to the clock input of latch 322; hence gate 338 controls the latching operation of data received at data input 352. Data latch 322 "clocks in" or "latches" data one byte (i.e., 8 bits) at a time. The first input of AND gate 338 (marked with a "1") is coupled to 2×1 multiplexer 326. Control input 354 (bearing signal DVDACK) is coupled to a first data input of multiplexer 326 through polarity select 302. Control inputs 354 and 356 (bearing signals DVDACK and DVDCLK, respectively) are coupled to the second data input of multiplexer 326 through polarity selects 302 and 304, respectively, and AND gate 328. Control input 370 (bearing signal SYNC/ASYNC) is coupled to selection input of multiplexer 326 through programming register 314. The one-bit signal received at control input 370 is stored in programming register 314 during initialization of interface circuit 118. Provided the second and third inputs of AND gate 338 (marked with a "2" and a "3", respectively) remain high, the output of multiplexer 326 will operate as a latching signal to data latch 322 (through AND gate 338) when it changes state (i.e., during a falling transition).

The second input of AND gate 338 (marked with a "2") is coupled to OR gate 334. OR gate 334 receives input from AND gate 396, which in turn receives input from inverter 394 (coupled to the output of register 318) and negative counter 343 (used for countdown-type data transfers, as described below). OR gate 334 also receives input from AND gate 332 (which outputs a signal related to sector-type data transfers).

Programming register 324, which is coupled to counter 343, is used to store a numerical value that defines the length of a countdown-type transfer. During such data transfer, a non-zero value stored in register 324 is read by counter 343 and decremented by "one" at each falling transition of the output of multiplexer 326. At the same time, counter 343 outputs a high signal on line 345 and DVDDATA is latched into data latch 322 at each falling transition of the output of multiplexer 326. This latching operation continues until counter 343 reaches zero. At such time, the output of counter 343 (on line 345) goes low forcing the output of AND gate 396 to go low and thereby preventing any further loading of latch 322 (the output of AND gate 332 is low during countdown-type transfers via register 318). The clock input to counter 343 is coupled to the output of multiplexer 326. The value in register 324 is a user-programmable value generated by microcontroller 112 and received on control input 378.

The interconnection between register 324 and counter 343 not only allows for reading of data, but also affects the operation of counter 343 in at least one instance. Specifically, conventional logic interconnecting these elements causes counter 343 to maintain a high output signal on line 345 when a value of zero is loaded into register 324. This feature is used when neither countdown-type or sector-type data transfers are to be performed. In such situations, register 318 stores a zero (low) value and therefore outputs a low signal forcing the outputs of AND gate 332 and inverter 394 low and high, respectively. Accordingly, a high output from counter 343 (which is ANDed with the output of inverter 394) enables AND gates 338 and 336 to remain sensitive (i.e., active) to their other inputs.

Alternatively, if a sector-type transfer is to be performed (as described below), the output of counter 343 must remain low. This is achieved by ANDing the output of inverter 394 (which in a sector-type transfer will be low) with the output of converter 343 via gate 396.

As noted above, AND gate 332 provides the second input to OR gate 334 and is associated with sector-type data transfers. The inputs to AND gate 332 are coupled to flip-flop 320 and register 318. Flip-flop 320 has both set and reset inputs and may be configured as a conventional D-type flip-flop. The set input is coupled to control input 374 and the reset input is coupled to control input 360 through polarity select 308 and AND gate 392. This AND gate also receives a complemented value of the signal on input 374 via inverter 390.

The second input to AND gate 332 is coupled to control input 376 through programming register 318. Input 376 carries signal ONE SECTOR ENABLE generated by microcontroller 112 and stored in register 318 during operation of interface circuit 118. When high, this signal will enable a sector transfer to occur pursuant to the state of flip-flop 320.

Control input 374 passes signal START SECTOR TRANSFER to the set input of flip-flop 320 and to AND gate 392 through inverter 390. This signal is generated by microcontroller 112 and serves to initiate a sector transfer provided the enable signal on input 376 is high. At the end of a sector transfer (i.e., upon reaching the top of the sector) signal DVDTOS on input 360 is pulsed through polarity select 308 and applied to reset input of flip-flop 320 thereby resetting the flip-flop and outputting a low signal to AND gate 332. (At the time of issuing DVDTOS, the signal START SECTOR TRANSFER is low.)

If either input to OR gate 334 is high, this high signal will be passed to AND gate 338 allowing data latching to occur and to AND gate 336 allowing signal DVDREQ to remain active. However, if both inputs to gate 334 are low, then AND gates 338 and 336 will also be low thereby terminating data latching operations and fixing the value of signal DVDREQ (through AND gate 336 and polarity select 310).

The third input to AND gate 338 (marked with a "3") is coupled to NAND gate 330. The inputs to gate 330 are coupled to control input 358 (bearing signal DVDERROR) through polarity select 306 and control input 372 (bearing signal DISCARD DATA ENABLE) through programming register 312. If the signal on control input 372 and stored in register 312 is low, gate 330 will remain high thereby disabling signal DVDERROR. In such instance, data latch 322 will continue to accept data even though an error may have been detected in the data by DSP 110. Alternatively, if the value stored in register 312 is high, signal DVDERROR on control input 358 can control the output of gate 330 and thereby terminate latching operations in data latch 322 via AND gate 338 when an error is detected.

Finally, an ENABLE signal on control input 362 (which is stored in programming register 316 during operation of interface circuit 118) is input to AND gate 336 and contributes to the control of output signal DVDREQ. As noted above, this enable signal is generated by microcode run on processor 123 and indicates (when high) that interface circuit 118 is ready to receive data.

To summarize, interface circuit 118 includes five 1-bit serial connections (control inputs 354–360 and control output 364) and one 8-bit parallel connection. The 8-bit parallel connection is the carrier of encoded data between DVD DSP 110 and DVD decoder 116. The 1-bit serial connections are used to control the flow of the data over the 8-bit bus with the assistance of signals from multiplexer 112 (i.e., SYNC/ASYNC, DISCARD DATA ENABLE, START SECTOR TRANSFER, ONE SECTOR ENABLE and PROGRAMMABLE TRANSFER SIZE) and processor 123 (i.e., ENABLE). Each of the serial connections are programmable through polarity selects to allow for various active polarities and clock edges according to the requirements of a particular DVD DSP. Significantly, through polarity select programming interface circuit 118 can be configured to accommodate different DVD DSP communication interfaces.

TIMING DIAGRAMS

Figure 6:
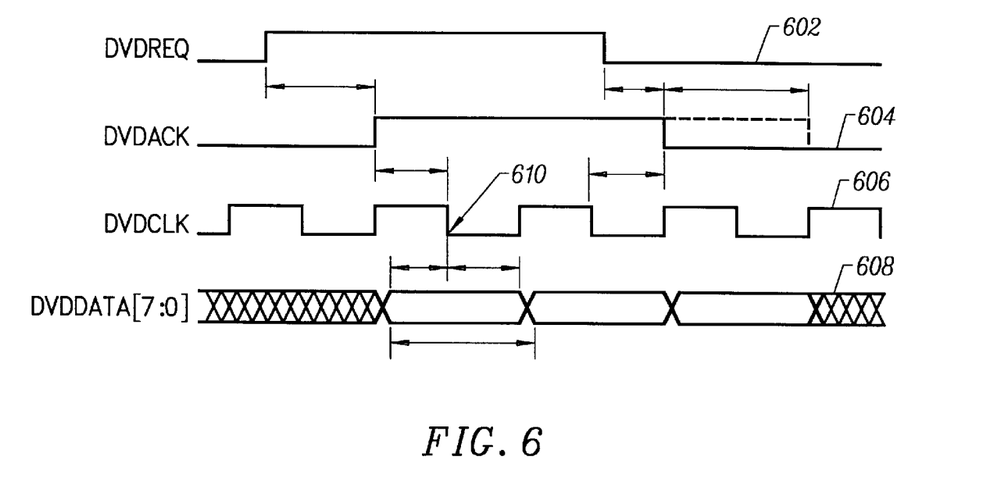
FIG. 6 is a timing diagram showing the use of DVDCLK as a strobe for DVDDATA.

Flexible interface circuit 118 can clock in (i.e., latch) the 8-bit DVDDATA according to a number of different methods. One common method is to use the falling or rising edge of the DVDCLK signal to capture the data whenever the DVDACK signal is active. Referring to FIG. 6, signals DVDREQ 602 and DVDACK 604 are active high and the falling edge of DVDCLK 606 is used as a strobe for DVDDATA 608. Referring to FIG. 3, this operation is achieved by appropriate programming of polarity selects (i.e., 302, 304 and 310), programming registers (i.e., 314, 318) and register 324. Specifically, polarity selects 302, 304 and 310 are set to effect the foregoing active states based upon actual input received from DSP 110 (selects 302, 304) and required by DSP 110 (select 310). (For example, it DSP 110 normally issues an active low DVDACK signal, polarity select 302 will be programmed to convert this to an active high signal for processing according to the timing diagram of FIG. 6.)

Further, SYNC/ASYNC signal stored in register 314 selects input "1" of multiplexer 326 (for synchronous operation), ONE SECTOR ENABLE signal stored in register 318 is low, and a zero value is loaded into register 324 thereby causing counter 343 to output a high signal on output line 345.

In this example, DVDDATA is clocked into latch 322 (FIG. 3) on falling edge 610 of DVDCLK. In accordance with the architecture of interface circuit 118 (FIG. 3), this latching operation could alternatively be triggered by the rising edge of DVDCLK by reprogramming polarity select 304 (whose programming toggles between a logic zero and logic one to select one of two complementary inputs on a 2×1 multiplexer; see FIG. 5).

Figure 7:
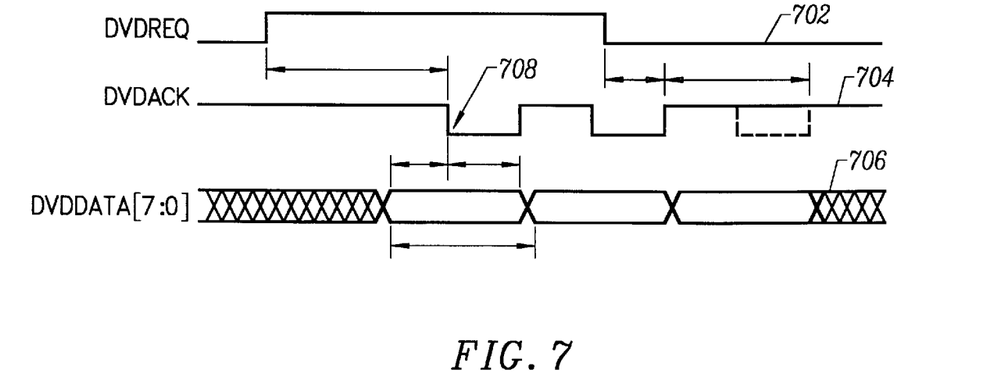
FIG. 7 is a timing diagram showing the use of DVDACK as a strobe for DVDDATA.

Another method for clocking in data uses the falling or rising edge of the DVDACK signal to capture the data. Referring to FIG. 7, signal DVDREQ 702 is active high, DVDACK 704 is active low and DVDACK 704 is also used as a strobe for DVDDATA 706. Referring to FIG. 3, this operation is achieved by appropriate programming of polarity selects (i.e., 302 and 310), programming registers (i.e., 314, 318) and register 324. Specifically, polarity selects 302 and 310 are set to effect the foregoing active states based upon actual input received from DSP 110 (select 302) and required by DSP 110 (select 310). Further, SYNC/ASYNC signal stored in register 314 selects input "0" of multiplexer 326 (for asynchronous operation), ONE SECTOR ENABLE signal stored in register 318 is low, and a zero value is loaded into register 324 to output a high signal from counter 343.

In this example, DVDDATA 706 is clocked into latch 322 (FIG. 3) on falling edge 708 of DVDACK. In accordance with the architecture of interface circuit 118 (FIG. 3), this latching operation could alternatively be triggered by the rising edge of DVDACK by reprogramming polarity select 302 (whose programming toggles between a logic zero and logic one to select one of two complementary inputs on a 2×1 multiplexer; see FIG. 5).

In accordance with conventional operation, DVDREQ signal is used to request data from a DVD DSP to a DVD decoder. By using a combination of the control signals identified herein (e.g., DVDACK, DVDCLK, DVDREQ, DVDERROR and DVDTOS) and associated polarity select settings, a particular DVD DSP employing different signal combinations and active status requirements (i.e., active high, active low, rising edge, falling edge, etc.) to communicate with an audio/video decoder (i.e., a different "communication interface") may be supported by interface circuit 118.

Figure 8:
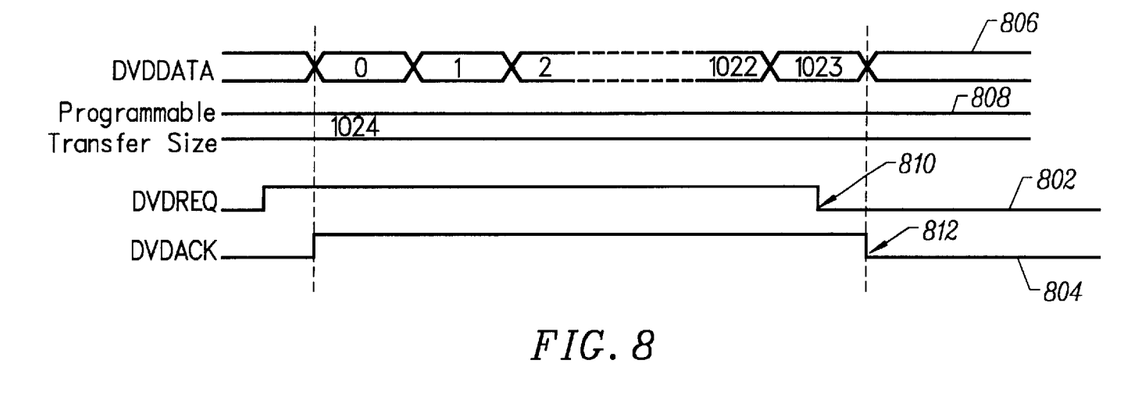
FIG. 8 is a timing diagram showing a countdown-type transfer of data.

Additional options for receiving data available through interface circuit 118 include a countdown-type data transfer. Referring to FIG. 8, DVDREQ 802 and DVDACK 804 are active high and DVDDATA is passed synchronously. Referring to FIG. 3, this operation is again achieved by appropriate programming of polarity selects (i.e., 302, 304, 310), programming registers (i.e., 314, 318) and register 324. Specifically, polarity selects 302, 304 and 310 are again set to effect the foregoing active states based upon the characteristics of DSP 110. Further, SYNC/ASYNC signal stored in register 314 selects input "1" of multiplexer 326 (for synchronous operation), ONE SECTOR ENABLE signal stored in register 318 is low, and a non-zero value is loaded into register 324. (DVDDATA may also be passed asynchronously in this data transfer mode by setting register 314 to select input "0" of multiplexer 326.)

In this example, microcontroller 112 (FIG. 1) generates PROGRAMMALE TRANSFER SIZE 808 specifying 1024 bytes of user data; this value being stored in register 324 through control input 378 of interface circuit 118. Next, counter 343 reads and processes (i.e., decrements) the numerical value stored in register 324 by "1" at every falling transition of the output of multiplexer 326 (i.e., at every data latching of DVDDATA in latch 322 in either synchronous or asynchronous operation). Counter 343 maintains a high output to OR gate 334 (through AND gate 396) until this retrieved value is reduced to zero. (The value stored in register 324 is unaltered by the processing of counter 343, which reads the value from register 324 and thereafter processes this value internally.)

At such time as the retrieved numerical value in counter 343 reaches zero, the output of this counter goes low and forces a change in DVDREQ (through AND gate 396, OR gate 334, AND gate 336 and polarity select 310, as shown in FIG. 3), represented by falling edge 810 in FIG. 8. Upon receiving a low DVDREQ signal, DSP 110 responds with a low DVDACK signal represented by falling edge 812 and thus terminates the data transfer.

Figure 9:
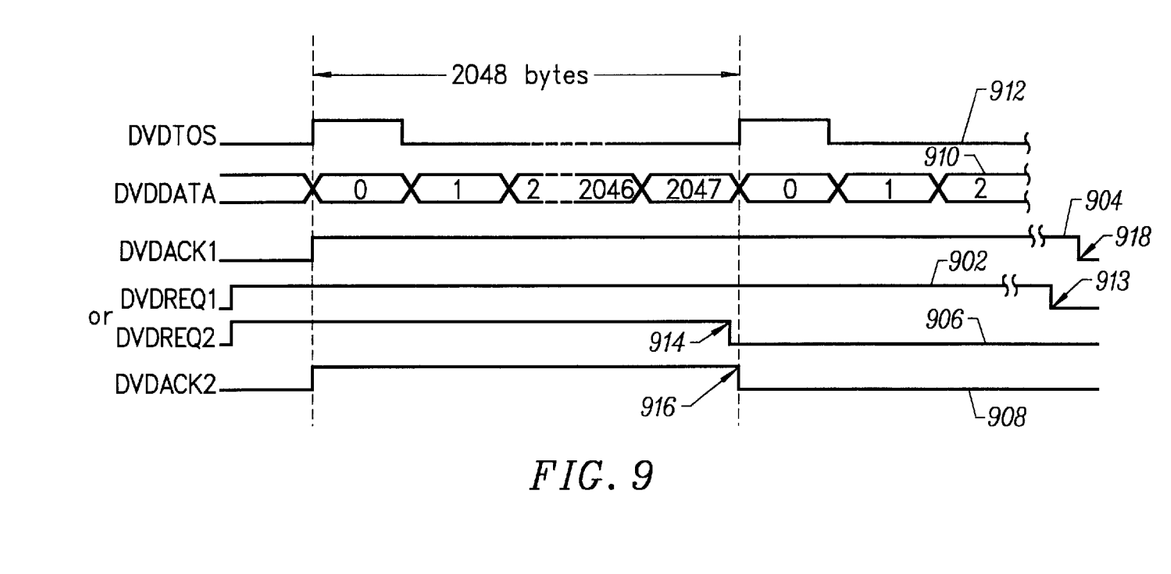
FIG. 9 is a timing diagram showing a sector-type transfer of data.

Interface circuit 118 can also utilize top-of-sector signals (DVDTOS) to facilitate a sector transfer of data (i.e., 2048 bytes). Referring to FIG. 9, DVDREQ1 902 and DVDACK1 904 are presented for comparison purposes. These signals are active high and represent a normal data transfer; i.e., interface circuit 118 (FIG. 3) receives data until memory 340 approaches a predefined threshold value which triggers threshold detection circuit 342 to issue a low signal to AND gate 336 and thereby terminate the transfer (i.e., deactivate DVDREQ1). In brief, DVDREQ1 is issued by interface circuit 118 and acknowledged by DSP 110 through DVDACK1. Once the request is terminated (as a result of reaching a threshold quantity in memory 340; represented by falling edge 913), DSP 110 again acknowledges this change in state by deactivating DVDACK1 at falling edge 918. (As shown in FIG. 9, transitions in DVDACK1 and DVDACK2 are simultaneous with transitions in DVDTOS and DVDDATA.)

In contrast, signals DVDREQ2 906 and DVDACK2 908 are active high but represent a sector transfer; i.e., 2048 bytes of data transferred synchronously from DSP 110 to interface circuit 118. This transfer is controlled by signal DVDTOS which, in this example, is also active high. Referring again to FIG. 3, this operation is achieved by appropriate programming of polarity selects (i.e., 302, 308, 310), programming registers (i.e., 314, 318) and register 324. Specifically, polarity selects are set to accommodate the characteristics of DSP 110 and effect the foregoing active states. Further, SYNC/ASYNC signal stored in register 314 selects input "1" of multiplexer 326 (for synchronous operation), ONE SECTOR ENABLE signal stored in register 318 is high, and START SECTOR TRANSFER signal is high thereby setting flip-flop 320 and temporarily disabling DVDTOS through AND gate 392 and inverter 390. (DVDDATA may also be passed asynchronously in this data transfer mode by setting register 314 to select input "0" of multiplexer 326.)

In this example, 2048 bytes of user data are transferred synchronously from DSP 110 to interface circuit 118. Upon transferring the last byte, DVDTOS pulses high thereby resetting flip-flop 320. In response, DVDREQ is forced low (through OR gate 334, AND gate 336 and polarity select 310, as shown in FIG. 3) as indicated by falling edge 914 in FIG. 9. Upon receiving a low DVDREQ signal, DSP 110 responds with a low DVDACK signal represented by falling edge 916 and thus terminates the data transfer.

The DVDTOS signal described above may also be used to greatly reduce the complexity of transferring a Video Object Unit ("VOBU") from a DVD disc. A VOBU consists of several sectors. Hence, rather than transferring a VOBU by specifying the number of bytes it contains (which would start in the thousands), a VOBU may be transferred in accordance with the invention simply by specifying the number of sectors it contains, and then performing a sector transfer for each one. Such application allows interface circuit 118 to handle VOBU still commands and VOBU by VOBU steps without extra software, which is important for DVD navigation systems.

Interface circuit 118 may also be programmed to accept data containing an error. When DVD DSP 110 detects an error in a particular stream of data read from a DVD disc, it may be programmed to simply discard the data or to forward such data to interface circuit 118. If forwarded, interface circuit 118 will process such data according to its programming. Referring to FIG. 3, if DISCARD DATA ENABLE signal (from microcontroller 112) stored in programming register 312 is low, DVDERROR signal on input 358 is effectively disabled through NAND gate 330. As such, data latch 322 will allow data to be clocked in regardless of its error status pursuant to the foregoing discussion. Such operation may be desired if the associated decoder 116 employs an error concealment routine that utilizes erroneous data.

Alternatively, if DISCARD DATA ENABLE signal stored in programming register 312 is high, DVDERROR signal on input 358 (and as modified by polarity select 306) controls the output of NAND gate 330. If the output of such gate is forced low, this in turn forces the output of gate 338 low which thereby disables the clock ("CLK") input to data latch 322. While such input is disabled, latch 322 is unable to clock in any new data. This option may be desired if there is no benefit or desire to pass data with errors to decoder 116.

In short, data containing errors may be kept or discarded according to the programming of interface circuit 118.

Figure 10:
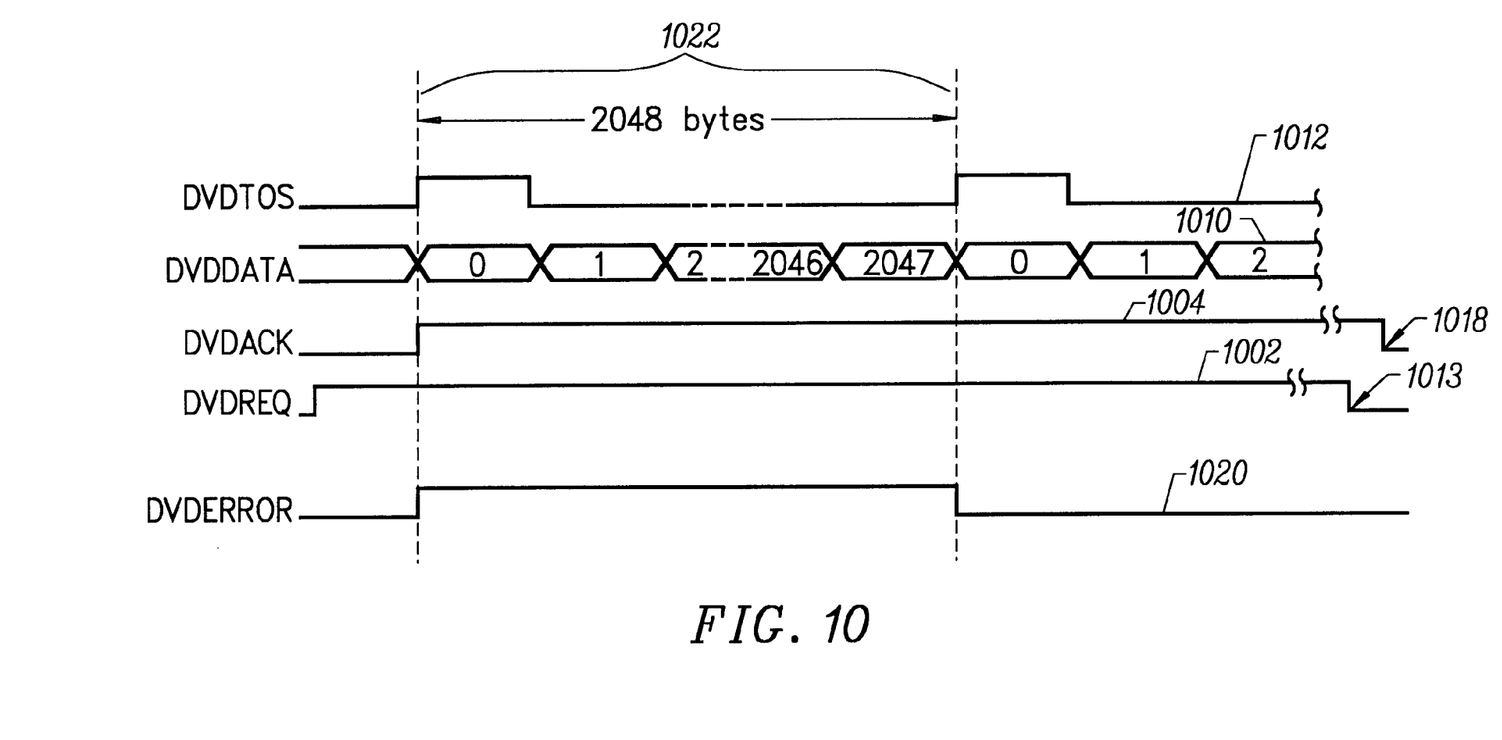
FIG. 10 is a timing diagram showing the use of DVDERROR.

FIG. 10 illustrates issuance of a DVDERROR signal 1020. Signals DVDREQ 1002 and DVDACK 1004 are active high and represent a normal data transfer, as described in connection with FIG. 9. DVDDATA 1010 is synchronously passed to latch 322 (FIG. 3) one byte at a time. DVDTOS signal 1012, although not utilized in this normal data transfer, is shown in FIG. 10 to simply illustrate one sector of data (i.e., 2048 bytes).

DVDERROR signal 1020 is issued by DSP 110 to identify erroneous data on a sector-by-sector basis. DSP 110 identifies an error in a given sector prior to its transmission. Upon transmitting such sector (e.g., sector 1022 of FIG. 10), DSP 110 also outputs an active DVDERROR signal (in this example, active high) to coincide with the transmission of bad data.

Accordingly, pursuant to the foregoing discussion, if DISCARD DATA ENABLE signal stored in register 312 is low, DVDERROR signal 1020 will have no effect on the operation of interface 118 and sector 1022 shall be clocked in according to normal operations. However, if the signal stored in register 312 is high, DVDERROR signal 1020 shall disable the clock input to latch 322 thereby preventing any byte in sector 1022 from being clocked in to latch 322.

Although DVD ERROR 1020 operates to identify sectors containing error(s), it would be apparent to one having ordinary skill in the art that DVDERROR may alternatively operate to identify other data segments containing errors, such as bytes. In such circumstances interface 18 may operate (as described above) to exclude such other data segments when appropriately programmed.

In the example of FIG. 10, it is assumed that DSP 110 issues an active high DVDERROR signal. However, if DSP 110 issues an active low DVDERROR signal, polarity select 306 may be programmed to convert this signal to an active high signal for processing according to the timing diagram of FIG. 10.

While the foregoing is a complete description of the embodiments of the invention, various modifications, alternatives and equivalents may be used. Accordingly, the above description should not be taken as limiting the scope of the invention which is defined by the appended claims.

What is claimed is:

1. A DSP interface circuit comprising:
   a data input for receiving data;
   a first control input for receiving a first control signal operable to control reception of said data; and
   a first polarity select coupled to said first control input, said polarity select being programmable to change state of said first control signal from active high to active low.

2. The DSP interface circuit of claim 1 further comprising:
   a second control input for receiving a second control signal operable to control reception of said data; and
   a second polarity select coupled to said second control input, said polarity select being programmable to change state of said second control signal.

3. The DSP interface circuit of claim 2 further comprising:
   a programming register coupled to said first and second polarity selects, said programming register holding bits for programming said first and second polarity selects.

4. The DSP interface circuit of claim 2 further comprising:
   a flip flop coupled to said first control input, said flip flop limiting reception of said data to a single sector of data at a time.

5. The DSP interface circuit of claim 4 wherein said first control signal is a top-of-sector signal.

6. The DSP interface circuit of claim 4 further comprising a negative counter coupled to said second control input, said negative counter limiting periodic reception of said data to a programmable quantity.

7. The DSP interface circuit of claim 6 wherein said second control signal is a clock signal.

8. An optical disc system comprising:
   a DSP that processes and outputs data retrieved from an optical disc;
   a DSP interface circuit coupled to said DSP, said DSP interface circuit having a data input for receiving said data and a plurality of control inputs for receiving a plurality of control signals operable to control reception of said data; and
   a plurality of polarity selects coupled to said plurality of control inputs, said polarity selects being programmable to change state of each of said plurality of control signals from active high to active low or from rising edge to falling edge.

9. The optical disc system of claim 8 further comprising a programming register coupled to said plurality of polarity selects, said programming register holding programming bits for programming said plurality of polarity selects.

10. The optical disc system of claim 9 further comprising a microcontroller coupled to said DSP interface circuit, said microcontroller being operable to send said programming bits to said control register.

11. The optical disc system of claim 10 further comprising a ROM coupled to said microcontroller, said ROM being operable to hold said programming bits.

12. The optical disc system of claim 8 further comprising a flip flop coupled to a first control input of said plurality of control inputs, said flip flop limiting reception of said data to a single sector of data at a time.

13. The optical disc system of claim 12 further comprising a negative counter coupled to a second control input of said plurality of control inputs, said negative counter limiting periodic reception of said data to a programmable quantity.

14. The optical disc system of claim 13 further comprising a microcontroller coupled to said DSP interface circuit, said microcontroller being operable to set said flip flop.

15. A DVD system comprising:
   a DVD DSP that generates data signals and a plurality of control signals; and
   an audio/video decoder, coupled to said DVD DSP, that generates audio and video signals, said decoder including a DVD-DSP interface circuit, said interface circuit including:
      a data input for receiving said data signals;
      a plurality of control signal inputs operable to receive said plurality of control signals to control reception of said data signals; and
      a plurality of polarity selects coupled to said plurality of control signal inputs, said polarity selects being programmable to change state of each of said plurality of control signals from active high to active low or from rising edge to falling edge.

16. The DVD system of claim 15 further comprising a first programming register coupled to said plurality of polarity selects, said programming register holding programming bits for programming said plurality of polarity selects.

17. The DVD system of claim 16 further comprising:
   first logic means, coupled to a first subset of said plurality of control signal inputs, for facilitating synchronous and asynchronous operation; and a second programming register, coupled to said first logic means, for selecting synchronous or asynchronous operation.

18. The DVD system of claim 17 further comprising:

second logic means, coupled to a second subset of said plurality of control signal inputs, for facilitating sector-type data transfer; and a third programming register, coupled to said second logic means, for enabling a sector-type data transfer.

19. The DVD system of claim 18 further comprising:

a negative counter, coupled to said first logic means, for facilitating countdown-type data transfer; and a fourth programming register, coupled to said negative counter, for setting a count limit.

20. The DVD system of claim 19 further comprising:

a logic gate, coupled to a third subset of said plurality of control signal inputs, for facilitating notification of errors in said data signals; and a fifth programming register, coupled to said logic gate, for enabling data signals containing errors to be received by said audio/video decoder.

21. A DSP interface circuit comprising:

a data input for receiving data;

a first control input for receiving a first control signal operable to control reception of said data;

a first polarity select coupled to said first control input, said polarity select being programmable to change state of said first control signal;

a second control input for receiving a second control signal operable to control reception of said data;

a second polarity select coupled to said second control input, said polarity select being programmable to change state of said second control signal;

a flip flop coupled to said first control input said flip flop limiting reception of said data to a single sector of data at a time; and a negative counter coupled to said second control input, said negative counter limiting periodic reception of said data to a programmable quantity.

22. An optical disc system comprising:

a DSP that processes and outputs data retrieved from an optical disc;

a DSP interface circuit coupled to said DSP, said DSP interface circuit having a data input for receiving said data and a plurality of control inputs for receiving a plurality of control signals operable to control reception of said data;

a plurality of polarity selects coupled to said plurality of control inputs, said polarity selects being programmable to change state of each of said plurality of control signals;

a flip flop coupled to a first control input of said plurality of control inputs, said flip flop limiting reception of said data to a single sector of data at a time; and a negative counter coupled to a second control input of said plurality of control inputs, said negative counter limiting periodic reception of said data to a programmable quantity.

23. A DVD system comprising:

a DVD DSP that generates data signals and a plurality of control signals;

an audio/video decoder, coupled to said DVD DSP, that generates audio and video signals, said decoder including a DVD-DSP interface circuit, said interface circuit including:

a data input for receiving said data signals;

a plurality of control signal inputs operable to receive said plurality of control signals to control reception of said data signals;

a plurality of polarity selects coupled to said plurality of control signal inputs, said polarity selects being programmable to change state of each of said plurality of control signals;

a first programming register coupled to said plurality of polarity selects, said programming register holding programming bits for programming said plurality of polarity selects;

first logic means, coupled to a first subset of said plurality of control signal inputs, for facilitating synchronous and asynchronous operation; and a second programming register, coupled to said first logic means, for selecting synchronous or asynchronous operation.

* * * * *